Patented Sept. 19, 1933

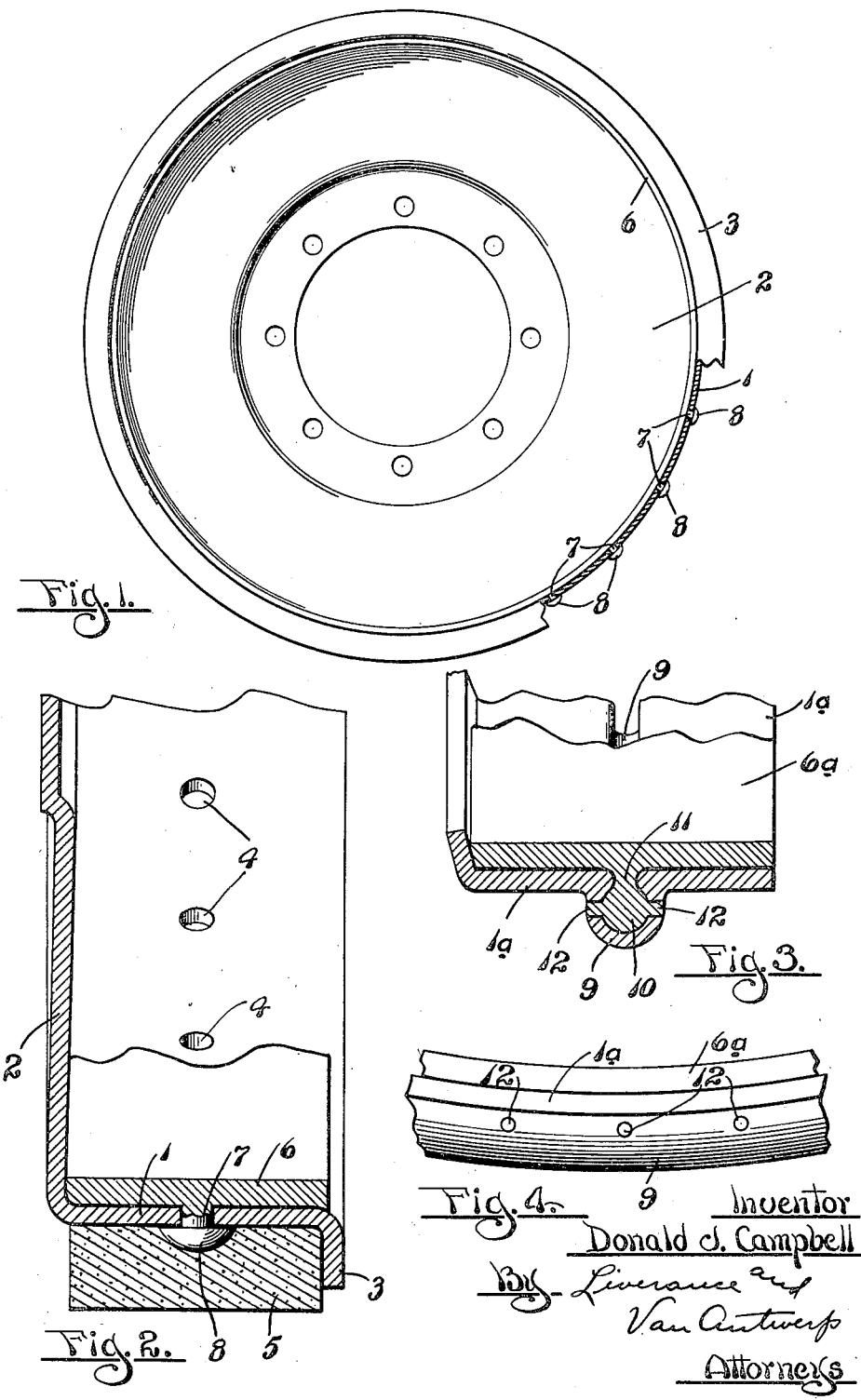

1,927,306

UNITED STATES PATENT OFFICE 1,927,306

COMPOSITE BRAKE DRUM

Donald J. Campbell, Muskegon Heights, Mich., assignor to Campbell, Wyant & Cannon Foundry Company, Muskegon Heights, Mich., a corporation of Michigan Application June 8, 1931. Serial No. 542,736

2 Claims. (Cl. 188—218)

This invention relates to a composite drum structure of particular utility in connection with brake drums of automobiles though in no sense limited to such one place of use. It is an object and purpose of the present invention to make a composite drum structure including an outer member of rolled, pressed or otherwise formed sheet metal, lining the same preferably, with cast iron of a high grade and quality though, insofar as the present invention is concerned, the lining may consist of any suitable metal which may be cast in conjunction with the outer drum or band of pressed, rolled or preformed metal.

In the connection of the cast metal to the outer drum or band it is very desirable that there shall be an exceedingly close engagement of the two metals and a connection which will preclude the movement of the one with respect to the other. Particularly is this so with automobile brake drums.

I have heretofore filed application for a patent, Ser. No. 512,792, filed Feb. 2, 1931, on Centrifugal casting process for depositing and fusing cast iron or other equivalent metal at the inner side of a preformed drum or band, the fusing engagement of the two metals providing the necessary close and intimate connection and obviating any possibility of relative movement of the outside drum and the inside band with respect to each other.

The present invention is directed to a brake band where there may be only a mechanical connection of the inside cast metal band with the outside preformed band or drum and yet at the same time through the construction made and the process of casting which the construction undergoes there is an especially snug and tight connection of the inside cast metal band to the outer preformed band or drum.

An understanding of the invention may be had from the following description, taken in connection with the accompanying drawing, in which, Fig. 1 is a side elevation of a brake drum made in accordance with my invention.

Fig. 2 is a fragmentary enlarged vertical section illustrating the manner in which the connection of the inner cast metal band may be made to the outer formed drum.

Fig. 3 is a fragmentary vertical connection through one side of a different form of construction of cast metal lining band operating on the same principle, and Fig. 4 is a fragmentary side elevation thereof.

Like reference characters refer to like parts in the different figures of the drawing.

The invention is illustrated in connection with brake drums in which the drum includes an annular band 1 pressed, rolled or otherwise formed into shape joined with which is a back or web 2 which, while in practice it may be formed separately from the annular band 1, is securely welded thereto to provide an integral structure. The band 1 at its free edge may be provided with an outturned continuous annular flange 3. In one form of my invention, that shown in Figs. 1 and 2, a plurality of openings 4 are made in spaced apart relation through the part 1 of the drum and while the same are shown in alinement the invention is not restricted to the particular positioning of the openings.

In applying the cast metal inner band against the inner sides of the annular drum portion 1 an outer core 5 of suitable sand is formed with rivet head recesses to come one opposite each of the openings 4 made through the part 1.

The cast metal is applied to the inner side of the band 1 in any practical manner. It may be applied centrifugally as described in my previous application for patent above referred to, or it may be applied in other ways. There is produced a continuous circular inner band 6 of cast metal from which integral shanks 7 extend through the openings 4 and join with integral heads 8 which fill the recess in the core 5.

It is evident that the fluid cast metal, which is applied to the inner side of the drum, will be considerably higher in temperature than the temperature of the drum or drum band 1 and that the shanks 7 when they become solid will still be at a very high temperature; and as the metal cools, these shanks will contract in length drawing the heads 8 snugly against the outer side of the drum band 1 and the cast band 6 against the inner side thereof; and at the same time the said shanks serve as a positive holding means preventing any movement of the two parts of the composite brake drum with respect to each other.

In Figs. 3 and 4 a different form of construction embodying the invention is illustrated. The drum band 1a is provided with a rolled or pressed annular rib 9 continuous around its outer side which is formed so as to make a continuous annular recess at the inner side of the band narrower at the inner portion of the drum band 1a and enlarging outwardly therefrom. When the cast metal 6a is deposited or cast or otherwise applied to the drum the metal flows into this annular recess making an enlarged body 10 within the rib 9 and with a narrower connecting continuous annular neck 11 between the body 10 and the cast metal band 6a as shown in Fig. 3.

This construction likewise is subjected to the contraction of the narrower connection portion 11 between the larger body 10 and the band 6a serving the same purpose as shanks 7 of the drawing the cast band 6a tightly against the preformed band 1a. For the purpose of locking the two parts together against any circumferential movement with respect to each other, spaced apart openings may be made through the sides of the rib 9 so that the metal will flow thereinto from the body 10 described thereby making locking projections 12 as shown in Figs. 3 and 4.

The construction of composite brake band described is one of practical form and one which will withstand the severe usage to which brake drums are subjected in service. The proper snug and inseparable connection of cast iron to preformed brake drums or bands is a matter of very great difficulty but with the present invention a mechanical connection of the two parts and the metals which are used to make the same is secured which is effective.

It is, of course, to be understood that in casting the inner cast metal band in place, if the process described in my prior application be followed for depositing the cast metal, that is, heating the drum or the band 1 or 1a to a high temperature, approximately 1400° F., and depositing the cast metal at approximately 2800° F. centrifugally thereagainst, there may be obtained also the beneficial effects of fusing the two metals together which will aid in producing a thoroughly practical and efficient drum structure capable of withstanding all of the usages to which it will be subjected when used as brake drums in automobiles. For other purposes, where the usage may not be so severe, as for instance in lining a preformed sheet metal pipe with a cast inner lining or the like, the interlocking mechanical connection alone illustrated and described will be amply sufficient.

The invention is defined in the appended claims and is to be considered comprehensive of all forms of structure coming within their scope.

I claim:

1. A construction comprising a preformed continuous annular band having an annular rib around the same forming a recess at the inner side of the band which is of larger cross section outwardly beyond the band than where the recess passes through the same, and a cast metal liner within the band having an integral rib thereon extending into and filling said recess, and having a body at the outer portion of the rib larger in cross section than the cross section of an intermediate connecting portion between said body and band.

2. A construction containing the elements in combination defined in claim 1, said rib on the band being provided with openings, and integral projections from the cast iron within the recess provided by said rib located in said openings, for the purpose specified.

DONALD J. CAMPBELL.